United States Patent [19]

Nussbaumer

[11] 3,892,953

[45] July 1, 1975

[54] DIGITAL FILTER

[75] Inventor: Henri Nussbaumer, LaGaude, France

[73] Assignee: International Business Machines Corporation, Armonk, N.Y.

[22] Filed: Oct. 10, 1974

[21] Appl. No.: 513,796

[30] Foreign Application Priority Data

Oct. 23, 1973 France .............................. 73.38742

[52] U.S. Cl. .................. 235/152; 235/156; 328/167

[51] Int. Cl. ............................ H04b 3/04; H04b 3/14

[58] Field of Search ............. 235/152, 156; 328/167

[56] References Cited

UNITED STATES PATENTS 3,676,654 7/1972 Melvin ................................ 235/152

*Primary Examiner*—Malcolm A. Morrison
*Assistant Examiner*—R. Stephen Dildine, Jr.
*Attorney, Agent, or Firm*—Delbert C. Thomas

[57] ABSTRACT

A digital filter in which a sample $y_i$ of the output filtered signal at any instant $i$ is derived from the sum of weighted data samples $$\sum_{k=1}^{n} a_k \cdot x_{1-k}$$

where $a_k$ are the filter coefficients and $x_{i-k}$ are data samples, the digital filter including:

means for simultaneously providing two consecutive data samples;

first adding means for providing a first set of terms by adding the first sample of said two consecutive samples to each one of a first set of filter coefficients $a_1, a_3, a_5 \ldots$;

second adding means for providing a second set of terms by adding the second sample of said two consecutive samples to each one of a second set of filter coefficients $a_0, a_2, a_4$. The total number of coefficients belonging to said first and second sets of coefficients being equal to $n$;

multiplying means for multiplying together pairs of terms belonging respectively to said first and second sets of terms;

means for providing the sign inverted product of said two consecutive data samples;

third adding means for individually adding said inverted product to each one of the results provided by said multiplying means;

a plurality of sequential delay means for individually delaying the outputs of said third adding means;

and a number of fourth adding means for adding the output of each of said delay means with the output of one of said third adding means.

3 Claims, 2 Drawing Figures

DIGITAL FILTER

This invention relates to a digital filter.

A digital filter is a device used to determine the values of the successive samples of a filtered signal by forming an algebraic sum of products. More specifically, if $x_{i-k}$ is the sample at instant $(i-k)$ of the signal to be filtered, the sample $y_i$ of the filtered signal must satisfy the expression:

$$y_i = \sum_{k=1}^{n} a_k \cdot x_{i-k} \quad (1)$$

where the $a_k$ are constant coefficients which depend upon the characteristics of the desired filter. A filter capable of generating samples $y_i$ that satisfy Eq. (1) is called an n-coefficient "transversal" filter. However, sample $y_i$ can also be determined from an expression which uses the previously computed samples $y_{i-k}$, in which case the resultant filter is called "recursive" and provides a sample $y_i$ which satisfies an expression of the form:

$$y_i = \sum_{k=1}^{n/2} a_k \cdot x_{i-k} + \sum_{k=1}^{n/2} b_k \cdot y_{i-k} \quad (2)$$

to a filter with n coefficients.

The above expressions show that, in either case, the computation of each $y_i$ involves n multiplications, so that the simplest type of digital filter would require n multipliers. This is a major disadvantage since multipliers are relatively expensive devices. It would therefore be desirable to provide structures that would permit minimizing the number of multipliers actually required.

It has previously been proposed to dispense with the multipliers altogether by storing in a read-only memory all of the words that are necessary to compute any sample $y_i$. However, in order for such an approach to be economical, the same filter would have to process a large number of signals simultaneously, using multiplexing techniques. In practice, it is not always possible to take full advantage of the capabilities of these filters. Consequently, various attempts have been made to develop new structures.

It is, therefore, an object of the present invention to provide digital filters which use a limited number of multipliers.

The foregoing and other objects, features and advantages of the invention will be apparent from the following more particular description of a preferred embodiment of the invention, as illustrated in the accompanying drawings.

Figures 1, 2:
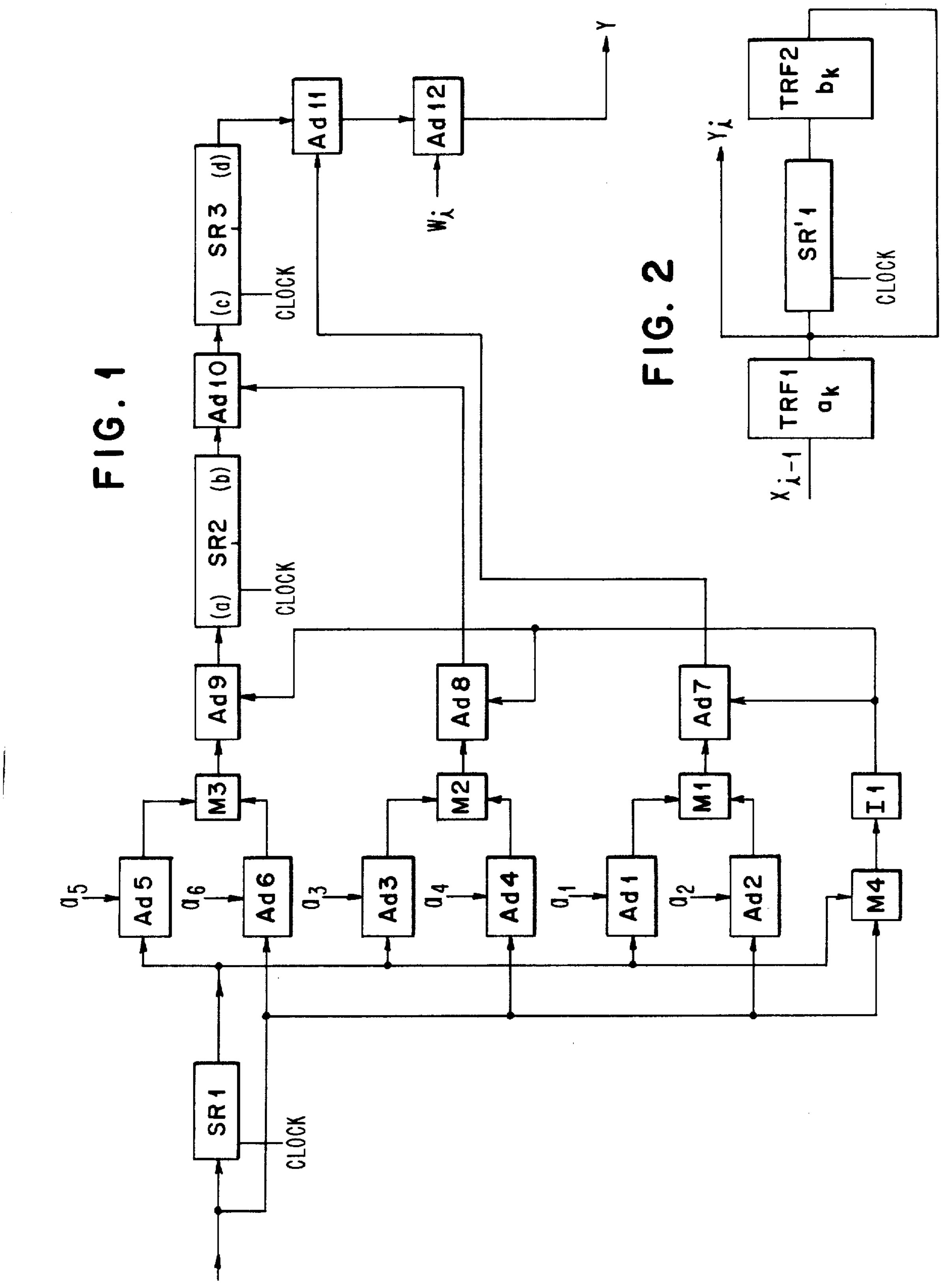
FIG. 1 shows a transversal digital filter built in accordance with the present invention.
FIG. 2 shows a recursive digital filter built in accordance with the present invention.

It should be observed that whether a transversal or a recursive type of digital filter is used, the expression defining sample $y_i$ of the filtered signal can be written:

$$y_i = \sum_{1}^{n} \alpha_k \cdot z_{i-k} \quad (3)$$

where the $\alpha$ represent coefficients $a$ and $b$, and the $z_{i-k}$ represent the data samples $x_{i-k}$ and/or $y_{i-k}$.

Expression (3) yields:

$$y_i = \alpha_1 z_{i-1} + \alpha_2 z_{i-2} + \alpha_3 z_{i-3} + \ldots + \alpha_n z_{i-n}.$$

$$y_{i+1} = \alpha_1 z_i + \alpha_2 z_{i-1} + \alpha_3 z_{i-2} + \ldots + \alpha_n z_{i+1-n}.$$

This may also be written:

$$y_i = \boxed{(\alpha_1 + z_{i-2})(\alpha_2 + z_{i-1}) - z_{i-1} z_{i-2}} + (\alpha_3 + z_{i-4})(\alpha_4 + z_{i-3}) - z_{i-3} \cdot z_{i-4} + \ldots - \sum_{p=1}^{n/2} \alpha_{2p-1} \cdot \alpha_{2p}$$

$$y_{i+1} = (\alpha_1 + z_{i-1})(\alpha_2 + z_i) - z_i \cdot z_{1-1} + \ldots \sum_{p=1}^{n/2} \alpha_{2p-1} \alpha_{2p}$$

$$y_{1+2} = (\alpha_1 + z_i)(\alpha_2 + z_{i+1}) - z_i z_{i+1} + \boxed{(\alpha_3 + z_{1-2})(\alpha_4 + z_{i-1}) - z_{i-1} z_{i-2}} + \ldots \sum_{p=1}^{n/2} \alpha_{2p-1} \alpha_{2p}.$$

An examination of $y_i$ and $y_{i+2}$ shows that the filtered signal samples can be determined diagonally instead of horizontally. Accordingly, the terms $u_i$ expressed as $$u_i = (\alpha_{2p-1} + z_{i-2})(\alpha_{2p} + z_{i-1}) - z_{i-1} z_{i-2}$$

where $p$ is an integer which successively assumes all values from 1 to $n/2$, are computed whenever a sample $z_{i-1}$ is received at the input of the filter. These terms are retained in shift registers until they may be used to provide the desired samples of the filtered signal.

FIG. 1 shows a six-coefficient, $a_1 - a_6$, transversal digital filter embodying the present invention. In the following description and in the appended drawings, the data paths and logic blocks are referred to as having single inputs and outputs. This is satisfactory for analog type filters but when digitial techniques are used, it is to be understood that each data line on the drawings is in reality a bus having a separate conductor for each binary order of a digital sample. A shift register is then a parallel array of circuits to retain all of the bits of a sample or two samples if a longer shift register is used. An adder has two sets of parallel inputs and provides a full set of parallel output signals. The multipliers used in the hereinafter described structure accept the multibit outputs of the busses and give as an output at least the more significant digits of their product.

The structures represented by the logic blocks of the drawings supply well-known functions and are conventional in the art. Representative circuits may be found in the books, "Arithmetic Operations in Digital Computers," by R. K. Richards, published by D. Van Nostrand Co., and copyrighted in 1955, Library of Congress Catalog Card No. 55-6234, and in "Manual of Logic Circuits," by G. A. Maley, published by Prentice-Hall, Inc., with a copyright date of 1970 and a Library of Congress Catalog Card No. 74-113716.

In the drawing, a shift register SR1 is provided at the input of the filter so that two consecutive samples of the input signal to be weighted are simultaneously available. Register SR1 can be made to store more than one input signal sample if data compression techniques and computation circuitry multiplexing techniques are used. Much such shift registers are disclosed in the prior art and are described, for example, in French Pat. No. 70.47663 and in U.S. patent application No. 513,797 by the same applicant. In the present filter, input signal samples $x_{i-1}$ and $x_{i-2}$ are simultaneously available while the filter is computing sample $y_i$. Sample $x_{i-1}$ is fed to one of the inputs of each of the digital adders Ad2, Ad4, and Ad6, respectively. Representative adders may be found in chapter 4 of the Richards reference and on pages 61 to 71 or pages 235 to 241 to the Maley book. Sample $x_{i-2}$ after its delay in SR1 is fed to an input of each of the adders Ad1, Ad3 and Ad5, the other inputs of which receive coefficients $a_1$, $a_3$ and $a_5$, respectively. As shown, adders Ad1 – Ad6 are connected in pairs to three multipliers, M1 – M3, in each of which the outputs from the associated pair of adders are multiplied together, while the data values for the signals $x_{i-1}$ and $x_{i-2}$ are multiplied together in a fourth multiplier, M4. The multipliers are constructed of adder and gate circuits as set out in chapter 5 of the Richards book, pages 138 to 144. The sign of the result of the latter operation is inverted by an inverter $I_1$, which provides $-x_{i-1} \cdot x_{i-2}$. This inverted product is fed to one of the inputs of each of three adders Ad7 – Ad9, the other inputs of which receive the outputs from multipliers M1, M2, M3, respectively. Thus, adders AD7 – Ad9 provide the following information:

| Output from | Information | | |
|---|---|---|---|
| Ad7 | $(a_1+x_{i-2})$ | $(a_2+x_{i-1})$ | $-x_{i-1} \cdot x_{i-2}$ |
| Ad8 | $(a_3+x_{i-2})$ | $(a_4+x_{i-1})$ | $-x_{i-1} \cdot x_{i-2}$ |
| Ad9 | $(a_5+x_{i-2})$ | $(a_6+x_{i-1})$ | $-x_{i-1} \cdot x_{i-2}$ |

The output from adder Ad9 is fed to the input of a shift register SR2 with a storage capacity of two words, the locations of which are labeled $(a)$ and $(b)$. The output from SR2 and that from adder Ad8 are added together in adder Ad10. The output from Ad10 is fed to the input of a shift register SR3 which is similar to SR2 and contains two sums, the locations of which are labeled $(c)$ and $(d)$. The output from SR3 and that from adder Ad7 are added togehter in adder Ad11. The sample $y_i$ of the output signal is obtained by adding a constant term $w_i$ expressed as $$w_i = - \sum_{p=1}^{3} a_{2p-1} \cdot a_{2p}$$

to the output from adder Ad11.

At the instant the device starts computing sample $y_i$, the contents of word locations $(a)$ to $(d)$ in registers SR2 and SR3 are as follows:

| Location | Content |
|---|---|
| $(a)$ | $(a_5+x_{i-3})(a_6+x_{i-2}) - x_{i-2} \cdot x_{i-3}$ |
| $(b)$ | $(a_5+x_{i-4})(a_6+x_{i-3}) - x_{i-3} \cdot x_{i-4}$ |
| $(c)$ | $(a_5+x_{i-5})(a_6+x_{i-4}) - x_{i-4}+x_{i-5}+$ $(a_3+x_{i-3})(a_4+x_{i-2}) - x_{i-2} \cdot x_{i-3}$ |
| $(d)$ | $(a_5+x_{i-6})(a_6+x_{i-5}) - x_{i-5} \cdot x_{i-6}+$ $(a_3+x_{i-4})(a_4+x_{i-3}) - x_{i-3} \cdot x_{i-4}$ |

It is seen that, at the instant considered, adder Ad9 loads $(a_5+x_{i-2})(a_6+x_{i-1}) -x_{i-1} \cdot x_{i-2}$ into location $(a)$. This causes the content of register SR2 to shift, the word at location $(b)$ being transferred into adder Ad10 wherein it is added to the term supplied by adder Ad8. Adder Ad10 then computes the word resulting from the operation $(a_5+x_{i-4})(a_6+x_{i-3}) -x_{i-3} \cdot x_{i-4} + (a_3+x_{i-2})(a_4+x_{i-1}) -x_{i-1} \cdot x_{i-2} = a_6 x_{i-4} + a_5 x_{i-3} - a_4 x_{i-3} + a_4 x_{i-2} + a_3 x_{i-1} + a_5 a_6 + a_3 a_4$. This word is then transferred to location $(c)$, which causes the content of register SR3 to shift, the word previously located at $(d)$ being fed to one of the inputs of adder Ad11, the other output of which receives at that time the output from adder Ad7. Adder Ad11 accordingly performs the following operation:

$$(a_5+x_{i-6})(a_6+x_{i-5}) -x_{i-5} \cdot x_{i-6} + (z_3 x_{i-4})(a_4+x_{i-3}) -x_{i-3} \cdot x_{i-4} + (a_1+x_{i-2})(a_2+x_{i-1}) - x_{i-1} \cdot x_{i-2}.$$

By adding the term $w_i$ to the word yielded by the latter operation, one finally obtains the following at the output y of the filter:

$$y_i = a_1 x_{i-1} + a_2 x_{i-2} + a_3 x_{i-3} + a_4 x_{i-4} + a_5 x_{i-5} + a_6 x_{i-6}.$$

which is the desired sample of the filtered signal.

The process described above is repeated as sample $x_i$ is received at the input of the filter to compute $y_{i+1}$, and so forth.

In summary, the filter of the present invention includes means for computing the terms $u_1$ defined as follows:

$$u_i = (\alpha_{2p-1} + z_{i-'2})(\alpha_{2p} + z_{i-1}) - z_{i-1} \cdot z_{i-2}$$

$p$ being an integer which assumes the value 1, 2, . . . , $n/2$. Note that if $n$ is odd, the next higher even number is to be used and it will be supposed that $\alpha_{n+1} = 0$.

The filter further includes delay means for delaying by $(2p-2)$ sampling periods or, more generally, elementary delays, each of the computed terms $u_1$. During each sampling period, the computed terms $u_i$ as delayed by said means are added together and the constant term $w_i$ defined as follows:

$$w_i = - \sum_{p=1}^{n/2} \alpha_{2p-1} \cdot \alpha_{2p}.$$

is added thereto, which yields the desired sample $y_i$.

As mentioned earlier, the present invention is also applicable to recursive digital filters.

A recursive filter capable of performing the operation defined by expression (2) and obtained by modifying the transversal filter of FIG. 1, is depicted diagrammatically in FIG. 2. To obtain sample $y_i$ of the filtered signal, input signal sample $x_{i-1}$ is fed to a transversal filter TRF1 of the type shown in FIG. 1. The output signal from TRF1 is fed to a shift register SR'1 whose output is applied to a second transversal filter TRF2. The output from TRF2 is fed back to the input of SR'1 and provides the desired sample $y_i$. All that is required to accurately perform the operation defined by expression (2) is to assign coefficients $a_k$ and $b_k$ to TRF1 and TRF2, respectively.

From the foregoing, it is seen that the structure provided by the present invention requires a maximum of $n/2+2$ multipliers for a filter with n coefficients. The invention is therefore advantageous in many applications, particularly in connection with the implementation of equalizers which are widely used in the field of data transmission. For example, the equalizer described in French patent application No. 73.38741 by the same applicant and shown in FIGS. 8a and 8b thereof could readily be modified in accordance with the teachings of the present invention. This could be done by replacing the filter of said FIG. 8*a* with the transversal filter depicted in FIG. 1 of the present invention after adding to the latter device a first delay line at the data input and a second delay line at the output of inverter $I_1$.

Although it has been assumed in the foregoing description, for purposes of simplicity, that the amount of elementary delay between consecutive filter coefficients is essentially equal to the delay between two consecutive data samples, the present invention also applies where a different amount of delay is selected.

While the invention has been shown and described with reference to a particular embodiment thereof, it will be understood by those skilled in the art that the foregoing and other changes in form and detail may be made therein without departing from the spirit and scope of the invention.

What is claimed is:

1. A digital filter for filtering signals representing bytes of data corresponding to samples of an analog signal carrying information and noise, said filter including:

a first plurality of adders, each having a constant input indicating a coefficient term of said filter and a second input receiving and byte signals;

a shift register to delay said byte representing signals by one sample period;

a second plurality of adders, each having a constant input representing other filter coefficient terms and another input receiving the output of said shift register;

a plurality of multiplier circuits, one receiving said byte representing signals and the output of said shift register and the others each receiving the outputs of one adder from said first plurality and one adder from said second plurality;

an inverter to complement the sign of the output of said one multiplier;

a third plurality of adders to combine the outputs of each of said other multipliers with the sign inverted output of said one multiplier; and a group of shift registers and adders to combine the outputs of said third plurality of adders in a time delayed sequence to provide output signals representing the data bytes of said information signal.

2. A digital filter as set out in claim 1 in which said last group of shift registers and adders comprise:

a second shift register having a time delay equal to a multiple of two data sampling periods and receiving the output of one of said third plurality of adders;

a fourth adder to combine the output of said second shift register with the output of another one of said third plurality of adders;

a third shift register similar to said second shift register; and a fifth adder to sum the output of said third shift register with the output of still another of said third plurality of adders.

3. A digital filter as set out in claim 1, in which said last group of shift registers and adders comprise a series of alternate shift registers and adders wherein said shift registers delay on input byte for two data sampling periods and the adders combine the output of a prior shift register with the output from one of said third plurality of adders to provide an input to the next sequential shift register, the output of said last adder being a sequence of bytes representing the filtered input information signal.

* * * * *